United States Patent
Soehnlen et al.

(10) Patent No.: US 6,247,507 B1
(45) Date of Patent: Jun. 19, 2001

(54) SYSTEM FOR PROCESSING AND PACKAGING MILK AND OTHER BEVERAGES

(75) Inventors: Daniel P. Soehnlen, Canton; Gregory J. Watkins; Gregory M. Soehnlen, both of North Canton, all of OH (US)

(73) Assignee: Creative Edge Design Group, Ltd., Canton, OH (US)

( * ) Notice: Subject to any disclaimer, the term of this patent is extended or adjusted under 35 U.S.C. 154(b) by 0 days.

(21) Appl. No.: 09/408,633

(22) Filed: Sep. 30, 1999

Related U.S. Application Data

(60) Provisional application No. 60/102,491, filed on Sep. 30, 1998.

(51) Int. Cl.[7] .................................................. B65B 1/04
(52) U.S. Cl. .................................. 141/2; 141/9; 141/104; 141/100; 141/83; 426/582
(58) Field of Search ................................ 426/586; 141/2, 141/9, 82, 90, 91, 18, 104–107, 392, 100, 83; 53/237, 474

(56) References Cited

U.S. PATENT DOCUMENTS

| | | | |
|---|---|---|---|
| 5,137,738 | * | 8/1992 | Wynn . |
| 5,357,852 | * | 10/1994 | Kohler et al. . |
| 5,687,779 | * | 11/1997 | Andersson et al. . |
| 6,103,287 | * | 8/2000 | Soehnlen et al. . |

\* cited by examiner

Primary Examiner—Steven O. Douglas
(74) Attorney, Agent, or Firm—Fay, Sharpe, Fagan, Minnich & McKee, LLP

(57) ABSTRACT

A system and process for packaging fluid products such as milk and other beverages is disclosed. The fluid product is produced when required and in response to a customer order. For example, milk is received and stored in a raw milk storage silo and separated into two varieties having different butter fat content. A customer order is processed and the system creates labels and fills containers or bottles exactly to meet the customer requirements. The products are palletized and loaded for shipment to the customer. Preferred filling equipment locates a container on a load cell to measure a predetermined amount of the first variety of milk into the container. The container is then filled with a second variety of milk by weight, if necessary, before capping. A supervisory control system directs bottle making, labeling, filling, bundling, and palletizing with virtually no inventory of empty bottles, preprinted labels, finished or prepackaged product inventories. The system and process provides a micro dairy that applies these features to a warehouse distribution network.

21 Claims, 20 Drawing Sheets

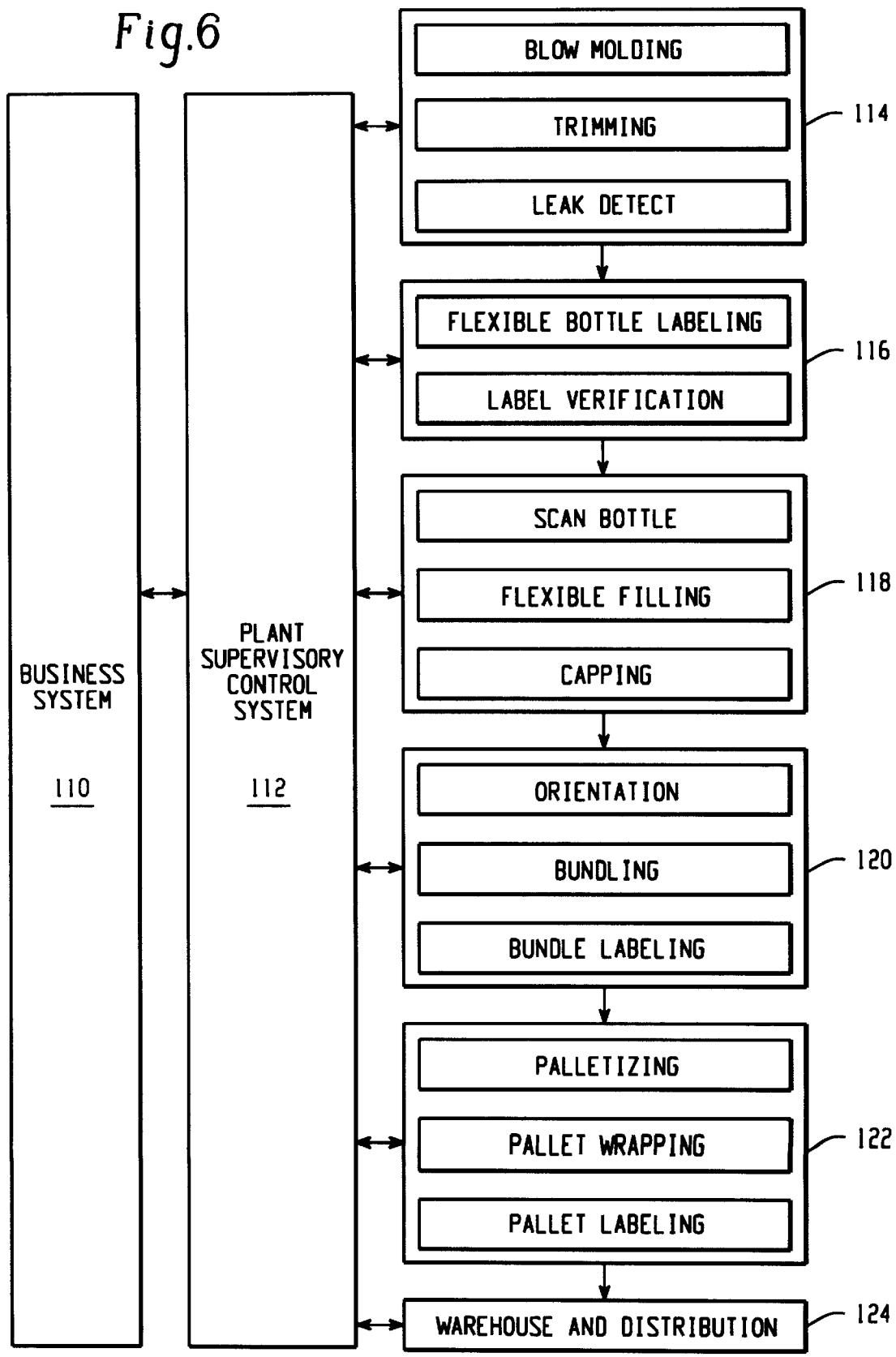

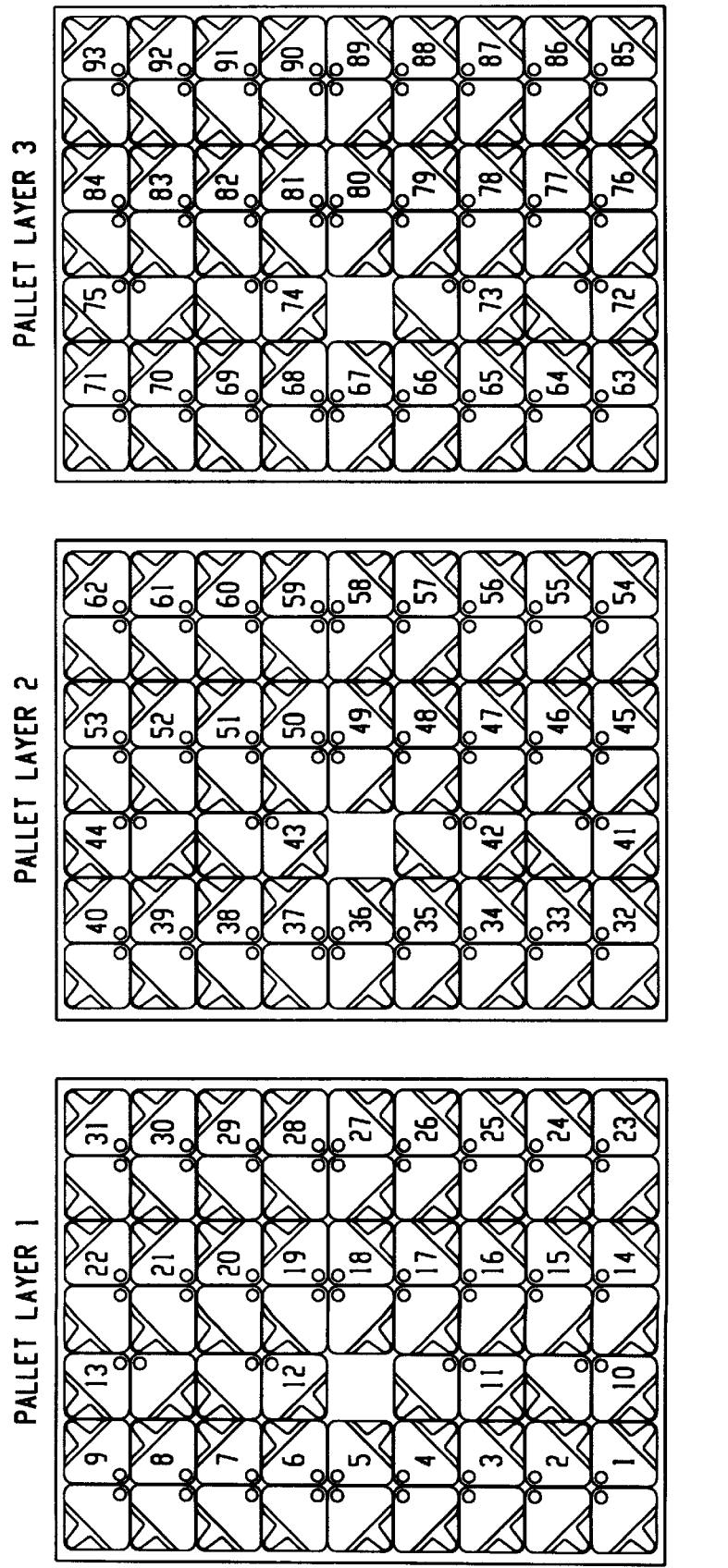
Fig. 8A1

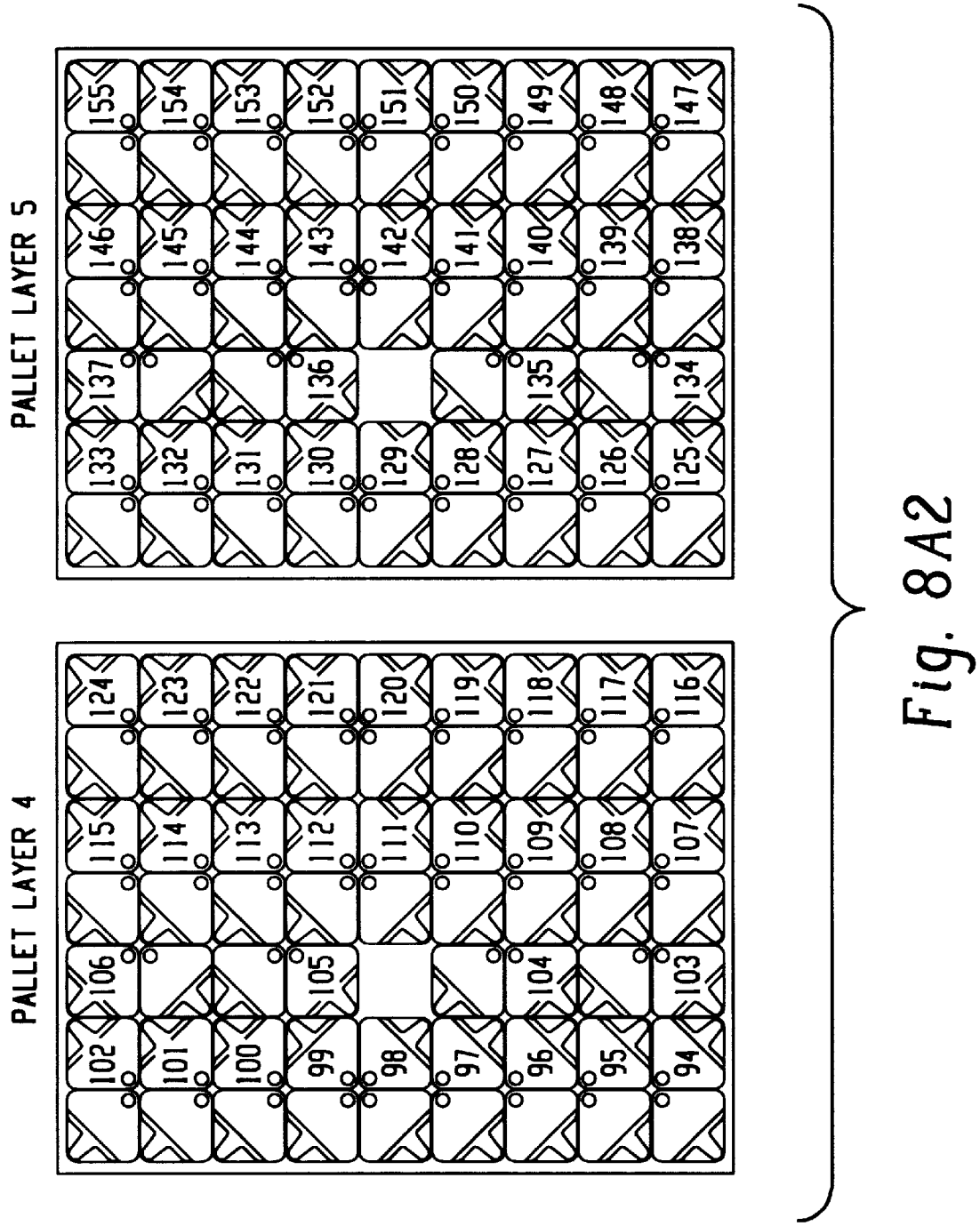
Fig. 8A2

| BUNDLE LOCATION | PALLET NUMBER 1 | PALLET NUMBER 2 | PALLET NUMBER 3 | PALLET NUMBER 4 | PALLET NUMBER 5 | PALLET NUMBER 6 | PALLET NUMBER 7 | PALLET NUMBER 8 |
|---|---|---|---|---|---|---|---|---|
| 1  | 2% | 2% | 2% | 3.25% | SKIM | 1% | 3.25% | 1% |
| 2  | 2% | 2% | 2% | 3.25% | SKIM | 1% | 3.25% | 1% |
| 3  | 2% | 2% | 2% | 3.25% | SKIM | 1% | 3.25% | 1% |
| 4  | 2% | 2% | 2% | 3.25% | SKIM | 1% | 3.25% | 1% |
| 5  | 2% | 2% | 2% | 3.25% | SKIM | 1% | 3.25% | 1% |
| 6  | 2% | 2% | 2% | 3.25% | SKIM | 1% | 3.25% | 1% |
| 7  | 2% | 2% | 2% | 3.25% | SKIM | 1% | 3.25% | 1% |
| 8  | 2% | 2% | 2% | 3.25% | SKIM | 1% | 3.25% | 1% |
| 9  | 2% | 2% | 2% | 3.25% | SKIM | 1% | 3.25% | 1% |
| 10 | 2% | 2% | 2% | 3.25% | SKIM | 1% | 3.25% | 1% |
| 11 | 2% | 2% | 2% | 3.25% | SKIM | 1% | 3.25% | 1% |
| 12 | 2% | 2% | 2% | 3.25% | SKIM | 1% | 3.25% | 1% |
| 13 | 2% | 2% | 2% | 3.25% | SKIM | 1% | 3.25% | 1% |
| 14 | 2% | 2% | 2% | 3.25% | SKIM | 1% | 3.25% | SKIM |
| 15 | 2% | 2% | 2% | 3.25% | SKIM | 1% | 3.25% | SKIM |
| 16 | 2% | 2% | 2% | 3.25% | SKIM | 1% | 3.25% | SKIM |
| 17 | 2% | 2% | 2% | 3.25% | SKIM | 1% | 3.25% | SKIM |
| 18 | 2% | 2% | 2% | 3.25% | SKIM | 1% | 3.25% | SKIM |
| 19 | 2% | 2% | 2% | 3.25% | SKIM | 1% | 3.25% | SKIM |
| 20 | 2% | 2% | 2% | 3.25% | SKIM | 1% | 1% | 1% |
| 21 | 2% | 2% | 2% | 3.25% | SKIM | 1% | 1% | 1% |
| 22 | 2% | 2% | 2% | 3.25% | SKIM | 1% | 1% | 1% |
| 23 | 2% | 2% | 2% | 3.25% | SKIM | 1% | 2% | SKIM |
| 24 | 2% | 2% | 2% | 3.25% | SKIM | 1% | 2% | SKIM |
| 25 | 2% | 2% | 2% | 3.25% | SKIM | 1% | 2% | SKIM |
| 26 | 2% | 2% | 2% | 3.25% | SKIM | 1% | 2% | SKIM |
| 27 | 2% | 2% | 2% | 3.25% | SKIM | 1% | 2% | SKIM |
| 28 | 2% | 2% | 2% | 3.25% | SKIM | 1% | 1% | SKIM |
| 29 | 2% | 2% | 2% | 3.25% | SKIM | 1% | 1% | SKIM |
| 30 | 2% | 2% | 2% | 3.25% | SKIM | 1% | 1% | SKIM |
| 31 | 2% | 2% | 2% | 3.25% | SKIM | 1% | 1% | SKIM |
| 32 | 2% | 2% | 2% | 3.25% | SKIM | 1% | 3.25% | 1% |
| 33 | 2% | 2% | 2% | 3.25% | SKIM | 1% | 3.25% | 1% |
| 34 | 2% | 2% | 2% | 3.25% | SKIM | 1% | 3.25% | 1% |
| 35 | 2% | 2% | 2% | 3.25% | SKIM | 1% | 3.25% | 1% |
| 36 | 2% | 2% | 2% | 3.25% | SKIM | 1% | 3.25% | 1% |
| 37 | 2% | 2% | 2% | 3.25% | SKIM | 1% | 3.25% | 1% |
| 38 | 2% | 2% | 2% | 3.25% | SKIM | 1% | 3.25% | 1% |
| 39 | 2% | 2% | 2% | 3.25% | SKIM | 1% | 3.25% | 1% |

Fig. 9A

| BUNDLE LOCATION | PALLET NUMBER 1 | PALLET NUMBER 2 | PALLET NUMBER 3 | PALLET NUMBER 4 | PALLET NUMBER 5 | PALLET NUMBER 6 | PALLET NUMBER 7 | PALLET NUMBER 8 |
|---|---|---|---|---|---|---|---|---|
| 40 | 2% | 2% | 2% | 3.25% | SKIM | 1% | 3.25% | 1% |
| 41 | 2% | 2% | 2% | 3.25% | SKIM | 1% | 3.25% | 1% |
| 42 | 2% | 2% | 2% | 3.25% | SKIM | 1% | 3.25% | 1% |
| 43 | 2% | 2% | 2% | 3.25% | SKIM | 1% | 3.25% | 1% |
| 44 | 2% | 2% | 2% | 3.25% | SKIM | 1% | 3.25% | 1% |
| 45 | 2% | 2% | 2% | 3.25% | SKIM | 1% | 3.25% | SKIM |
| 46 | 2% | 2% | 2% | 3.25% | SKIM | 1% | 3.25% | SKIM |
| 47 | 2% | 2% | 2% | 3.25% | SKIM | 1% | 3.25% | SKIM |
| 48 | 2% | 2% | 2% | 3.25% | SKIM | 1% | 3.25% | SKIM |
| 49 | 2% | 2% | 2% | 3.25% | SKIM | 1% | 3.25% | SKIM |
| 50 | 2% | 2% | 2% | 3.25% | SKIM | 1% | 3.25% | SKIM |
| 51 | 2% | 2% | 2% | 3.25% | SKIM | 1% | 1% | 1% |
| 52 | 2% | 2% | 2% | 3.25% | SKIM | 1% | 1% | 1% |
| 53 | 2% | 2% | 2% | 3.25% | SKIM | 1% | 1% | 1% |
| 54 | 2% | 2% | 2% | 3.25% | SKIM | 1% | 2% | SKIM |
| 55 | 2% | 2% | 2% | 3.25% | SKIM | 1% | 2% | SKIM |
| 56 | 2% | 2% | 2% | 3.25% | SKIM | 1% | 2% | SKIM |
| 57 | 2% | 2% | 2% | 3.25% | SKIM | 1% | 2% | SKIM |
| 58 | 2% | 2% | 2% | 3.25% | SKIM | 1% | 2% | SKIM |
| 59 | 2% | 2% | 2% | 3.25% | SKIM | 1% | 1% | SKIM |
| 60 | 2% | 2% | 2% | 3.25% | SKIM | 1% | 1% | SKIM |
| 61 | 2% | 2% | 2% | 3.25% | SKIM | 1% | 1% | SKIM |
| 62 | 2% | 2% | 2% | 3.25% | SKIM | 1% | 1% | SKIM |
| 63 | 2% | 2% | 2% | 3.25% | SKIM | 1% | 3.25% | 1% |
| 64 | 2% | 2% | 2% | 3.25% | SKIM | 1% | 3.25% | 1% |
| 65 | 2% | 2% | 2% | 3.25% | SKIM | 1% | 3.25% | 1% |
| 66 | 2% | 2% | 2% | 3.25% | SKIM | 1% | 3.25% | 1% |
| 67 | 2% | 2% | 2% | 3.25% | SKIM | 1% | 3.25% | 1% |
| 68 | 2% | 2% | 2% | 3.25% | SKIM | 1% | 3.25% | 1% |
| 69 | 2% | 2% | 2% | 3.25% | SKIM | 1% | 3.25% | 1% |
| 70 | 2% | 2% | 2% | 3.25% | SKIM | 1% | 3.25% | 1% |
| 71 | 2% | 2% | 2% | 3.25% | SKIM | 1% | 3.25% | 1% |
| 72 | 2% | 2% | 2% | 3.25% | SKIM | 1% | 3.25% | 1% |
| 73 | 2% | 2% | 2% | 3.25% | SKIM | 1% | 3.25% | 1% |
| 74 | 2% | 2% | 2% | 3.25% | SKIM | 1% | 3.25% | 1% |
| 75 | 2% | 2% | 2% | 3.25% | SKIM | 1% | 3.25% | 1% |
| 76 | 2% | 2% | 2% | 3.25% | SKIM | 1% | 3.25% | SKIM |
| 77 | 2% | 2% | 2% | 3.25% | SKIM | 1% | 3.25% | SKIM |
| 78 | 2% | 2% | 2% | 3.25% | SKIM | 1% | 3.25% | SKIM |

Fig. 9B

| BUNDLE LOCATION | PALLET NUMBER 1 | PALLET NUMBER 2 | PALLET NUMBER 3 | PALLET NUMBER 4 | PALLET NUMBER 5 | PALLET NUMBER 6 | PALLET NUMBER 7 | PALLET NUMBER 8 |
|---|---|---|---|---|---|---|---|---|
| 79 | 2% | 2% | 2% | 3.25% | SKIM | 1% | 3.25% | SKIM |
| 80 | 2% | 2% | 2% | 3.25% | SKIM | 1% | 3.25% | SKIM |
| 81 | 2% | 2% | 2% | 3.25% | SKIM | 1% | 3.25% | SKIM |
| 82 | 2% | 2% | 2% | 3.25% | SKIM | 1% | 3.25% | 1% |
| 83 | 2% | 2% | 2% | 3.25% | SKIM | 1% | 1% | 1% |
| 84 | 2% | 2% | 2% | 3.25% | SKIM | 1% | 2% | 1% |
| 85 | 2% | 2% | 2% | 3.25% | SKIM | 1% | 2% | SKIM |
| 86 | 2% | 2% | 2% | 3.25% | SKIM | 1% | 2% | SKIM |
| 87 | 2% | 2% | 2% | 3.25% | SKIM | 1% | 2% | SKIM |
| 88 | 2% | 2% | 2% | 3.25% | SKIM | 1% | 1% | SKIM |
| 89 | 2% | 2% | 2% | 3.25% | SKIM | 1% | 1% | SKIM |
| 90 | 2% | 2% | 2% | 3.25% | SKIM | 1% | 1% | SKIM |
| 91 | 2% | 2% | 2% | 3.25% | SKIM | 1% | 1% | SKIM |
| 92 | 2% | 2% | 2% | 3.25% | SKIM | 1% | 1% | SKIM |
| 93 | 2% | 2% | 2% | 3.25% | SKIM | 1% | 19A | SKIM |
| 94 | 2% | 2% | 2% | 3.25% | SKIM | | | |
| 95 | 2% | 2% | 2% | 3.25% | SKIM | | | |
| 96 | 2% | 2% | 2% | 3.25% | SKIM | | | |
| 97 | 2% | 2% | 2% | 3.25% | SKIM | | | |
| 98 | 2% | 2% | 2% | 3.25% | SKIM | | | |
| 99 | 2% | 2% | 2% | 3.25% | SKIM | | | |
| 100 | 2% | 2% | 2% | 3.25% | SKIM | | | |
| 101 | 2% | 2% | 2% | 3.25% | SKIM | | | |
| 102 | 2% | 2% | 2% | 3.25% | SKIM | | | |
| 103 | 2% | 2% | 2% | 3.25% | SKIM | | | |
| 104 | 2% | 2% | 2% | 3.25% | SKIM | | | |
| 105 | 2% | 2% | 2% | 3.25% | SKIM | | | |
| 106 | 2% | 2% | 2% | 3.25% | SKIM | | | |
| 107 | 2% | 2% | 2% | 3.25% | SKIM | | | |
| 108 | 2% | 2% | 2% | 3.25% | SKIM | | | |
| 108 | 2% | 2% | 2% | 3.25% | SKIM | | | |
| 110 | 2% | 2% | 2% | 3.25% | SKIM | | | |
| 111 | 2% | 2% | 2% | 3.25% | SKIM | | | |
| 112 | 2% | 2% | 2% | 3.25% | SKIM | | | |
| 113 | 2% | 2% | 2% | 3.25% | SKIM | | | |
| 114 | 2% | 2% | 2% | 3.25% | SKIM | | | |
| 115 | 2% | 2% | 2% | 3.25% | SKIM | | | |
| 116 | 2% | 2% | 2% | 3.25% | SKIM | | | |
| 117 | 2% | 2% | 2% | 3.25% | SKIM | | | |

Fig. 9C

| BUNDLE LOCATION | PALLET NUMBER 1 | PALLET NUMBER 2 | PALLET NUMBER 3 | PALLET NUMBER 4 | PALLET NUMBER 5 | PALLET NUMBER 6 | PALLET NUMBER 7 | PALLET NUMBER 8 |
|---|---|---|---|---|---|---|---|---|
| 118 | 2% | 2% | 2% | 3.25% | SKIM | | | |
| 119 | 2% | 2% | 2% | 3.25% | SKIM | | | |
| 120 | 2% | 2% | 2% | 3.25% | SKIM | | | |
| 121 | 2% | 2% | 2% | 3.25% | SKIM | | | |
| 122 | 2% | 2% | 2% | 3.25% | SKIM | | | |
| 123 | 2% | 2% | 2% | 3.25% | SKIM | | | |
| 124 | 2% | 2% | 2% | 3.25% | SKIM | | | |
| 125 | | | | | | | | |
| 126 | | | | | | | | |
| 127 | | | | | | | | |
| 128 | | | | | | | | |
| 129 | | | | | | | | |
| 130 | | | | | | | | |
| 131 | | | | | | | | |
| 132 | | | | | | | | |
| 133 | | | | | | | | |
| 134 | | | | | | | | |
| 135 | | | | | | | | |
| 136 | | | | | | | | |
| 137 | | | | | | | | |
| 138 | | | | | | | | |
| 139 | | | | | | | | |
| 140 | | | | | | | | |
| 141 | | | | | | | | |
| 142 | | | | | | | | |
| 143 | | | | | | | | |
| 144 | | | | | | | | |
| 145 | | | | | | | | |
| 146 | | | | | | | | |
| 147 | | | | | | | | |
| 148 | | | | | | | | |
| 149 | | | | | | | | |
| 150 | | | | | | | | |
| 151 | | | | | | | | |
| 152 | | | | | | | | |
| 153 | | | | | | | | |
| 154 | | | | | | | | |
| 155 | | | | | | | | |

Fig. 9D

SYSTEM FOR PROCESSING AND PACKAGING MILK AND OTHER BEVERAGES

CROSS REFERENCE TO RELATED APPLICATIONS

This application claims priority from provisional application Serial No. 60/102,491, filed Sep. 30, 1998.

BACKGROUND OF THE INVENTION

1. Field of the Invention

The present invention is directed to the art of beverage processing, and more particularly to processing beverages in the dairy industry. Processing involves standardizing or mixing various grades of milk (e.g., skim, 1%, 2%, 3.25% and others) and filling them, as well as other beverages such as juices, fruit drinks, chocolate milk, into suitable packaging or containers for sale to consumers. The containers are filled with milk and beverages in a sequence dictated by customer orders and distribution routes.

2. Discussion of the Art

Today's dairy industry has made strides in improving the efficiency of processing and filling operations. The focus of these improvements has been in processing and filling speeds, in the handling and storage of large volumes of specific products and in the order picking and loading processes associated with customer requirement fulfillment.

For example, U.S. Pat. No. 5,687,779 describes a filling system that utilizes large storage tanks (bowls) which provide a constant head pressure for servo pumps and valves to control the amount or volume placed in containers. Co-axial fill nozzles permit filling and mixing or standardizing of milk (e.g., the mixing together of varying ratios of skim and 3.25% milk to produce the intervening grades) from a single orifice. However, these filling features limit the ability for flexibility in the filling operation. While these prior art filling systems are capable of filling multiple sizes very effectively, they are very complex in terms of operation, cleaning, and maintenance. Furthermore, they standardize and fill volumetrically, and this does not permit rapid changes in filling from one milk type (e.g., 2%) to another milk type (e.g., 1%). The inability to have instant changeover limits the flexibility of the filling operation in a manner that will not permit a process output specifically in line with a customer order. If a customer orders just one unit of a particular grade of milk, existing systems will not allow for the building of orders to the accuracy of such one unit per shipping order. Volumetric filling is still further limited with respect to the smaller size packages such as the thirty-two (32) ounce sizes and under.

The storage, loading and order selection systems have tapped the automated storage and retrieval and the distribution center technologies to improve the manual processes used decades ago.

Examination of the dairy products processing, manufacturing and distribution business (excluding hard cheese) in the United States finds a focus on the white milk segments. Approximately fifty to sixty percent of the product these businesses ship is, by volume, white milk. To a very great extent, this will include white milk with varying milk fat contents of 3.25%, 2%, 1%, ½% and skim (non-fat).

The general process which these businesses follow starts with the receipt of raw milk which is temporarily stored in large tanks prior to processing. Storage in these vessels is limited by law to a maximum time of 72 hours. This milk is then processed into a variety of other products of which the white milk category is the largest segment. In virtually all instances, the next processing step is one of several heat treatment processes defined by the Food and Drug Administration and the Pasteurized Milk Ordinance. Examples of these processes are noted as follows:

a) High temperature Short Time Pasteurization—processing at a minimum of 161° F. for a minimum of 15 seconds (typically refrigerated code life of 10 to 25 days).

b) UHT (Ultra High Temperature) processing for extended shelf life—processing at a minimum of 280° F. for a minimum of 2 seconds for a refrigerated life of 45–60 days.

c) UHT Processing and Aseptic Packaging—processing at a minimum of 284° F. for a minimum of 4 seconds for a non-refrigerated life of approximately 180 days.

It is also understood that combinations of UHT processing, standard HTST (High Temperature Short Time) pasteurization and separation and filtration technologies are becoming additional desirable alternatives to strictly high temperatures to achieve longer code life in both refrigerated and non-refrigerated products. In this instance, the undesirable microorganisms are physically removed from the various skim milk portions while the high fat portion is UHT processed. After recombination, a long life product is achieved without the negative effect of standard UHT processing. Generally included in each of the pasteurization processes is a standardization process. This process includes the conversion of raw milk at a varying fat test over 3.25% to a fat test for the specific type of milk desired (i.e., 2%, 1%, etc.).

Each type of milk is then processed as a batch and stored in large holding tanks for packaging. These tanks and the processing systems typically are run in the batch mode for long periods of time, limited only by the regulatory agency requirements of cleaning and sanitizing at least once following a 24-hour processing day.

The filling process also occurs with a batch orientation. Generally speaking, the systems are arranged and operated such that individual fillers will draw a particular type of milk from one of the pasteurized storage vessels for a significant period of time. During this time, the filler will run estimated amounts for certain types of customers. In other instances, when an order is provided, exact amounts may be packaged.

In either case, the filler is packaging one product and one label at a time. When a different product is required to pass through the filling process, the system must be evacuated to prevent mixing of products. This results in down time, lost products, and lost packaging, etc.

In addition to product changes, the process requires label changes based on the needs of a specific customer. For example, a dairy may have 2% milk with its own brand and it also may have many other private labels identifying specific customer brands. This implies additional changes, manual intervention on processes and inefficiency.

The process of filling batches, attempting to run long batches to avoid excessive product and label changes, and the variability of customer requirements ultimately leads to substantial storage and finished inventory requirements. These inefficiencies have generally led the way for many of the current improvements such as using large automated storage systems to handle long continuous runs, large batches and large inventory requirements.

Looking at these current businesses from an order fulfillment perspective, it is clear that a variety of categories of requirements exist. Certain businesses have "captive customers" and can "dictate" an order fulfillment process that they currently consider optimal. This may include restrictions on order amounts, carrying inventory at store level, etc. Other businesses have customers who demand flexibility but provide little or no advanced information. These systems require the business to maintain inventory for the customers to assure an available supply as well as maintain a reasonable level of manufacturing efficiency. Despite the attempts at "just in time", none of the current systems have managed to eliminate large and complex material handling systems to handle the processed finished inventories or the inadequacies of the order fulfillment process.

The order fulfillment process includes distribution systems of substantial magnitude and cost. This aspect of current businesses also places demands on the manufacturing and storage processes. It is the optimization of the entire process that has further led to the notion of large buffer storage and ready availability through storage. In virtually all instances, large capital intensive storage facilities and material handling systems have been the apparent solution to the optimization of processing, packaging, order selection, and distribution systems.

The past improvements to or developments for industry problems have focused on individual elements of the order fulfillment process. Instances are available to demonstrate bigger and faster filling machines to reduce the labor cost of packaging. Instances can be shown where expenditures have been made to improve the interface between high-speed manufacturing and complex delivery systems to certain customers. It is apparent that current processing and improvements have not addressed the order fulfillment process as a comprehensive, continuous process. It would be desirable to develop a beverage processing and filling system that effectively meets the requirements of the entire order fulfillment process. This demands a system that eliminates the need for long batch type filling, large inventory requirements, and complex capital intensive material handling systems for milk and other beverages.

It would be further desirable to develop a system that would allow for filling milk and other beverages based on a truck loading and delivery schedule. In order to eliminate or significantly reduce the need for storage, the filling sequence would fill various grades and volumes of milk, along with other beverages, and place them on pallets for delivery routing according to the requested order, i.e., products will be produced and made to order at the proper time, speed, and in the exact quantities requirement by distribution for load out.

SUMMARY OF THE INVENTION

The present invention contemplates a new and improved system, which overcomes all of the above-referred problems and others and provides a filling method, which is efficient, economical and versatile.

An advantage of the present invention is that the processing and filling of milk and other beverages is done according to a truck loading rate based on customer orders.

Another advantage of the present invention is found in the dramatic reduction or elimination of inventory. Labor intensive picking and loading steps are reduced; as is the amount of waste due to expired shelf life. Only a small amount of buffer storage is suggested (on the order of 10% of the current inventory).

Yet another advantage of the present invention is the capability of integrating the processing with grocery and food service distribution centers. The truckload can contain the grocery or retail store's order for various products including milk. In the past, milk orders have been delivered to stores separately from other grocery items, directly from the dairy instead of the grocery distribution or warehousing centers.

Yet another advantage of the present invention is the method of filling. This method fills two wide range milk components in appropriate quantities to produce exact product specifications in a continuous operating mode. No change time or product drainage is required.

The system also provides for flexibility in labeling.

In addition, order lead time from the customer is based on truck departure/loading time. Orders can arrive minutes before loading, be inserted into the filling queue and then be processed. This aids in minimizing inventories at the storage level.

Packaging is done according to incoming orders. The products are filled by weight instead of volume to reduce shrinkage.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment which will be described in detail in this specification and illustrated in the accompanying drawings which form a part hereof.

FIG. 6 is a schematic representation of the flexible manufacturing process integrated into the plant supervisory control system in accordance with the present invention.

FIG. 9 lists a typical customer order broken down into pallet configurations.

DETAILED DESCRIPTION OF THE PREFERRED EMBODIMENTS

Reference will be made to the drawings which illustrate the present invention in the environment of a dairy that allows the manufacturer or dairy to package liquid products in a manner that optimizes the order fulfillment process. The products are produced only when they are required and only to satisfy a customer order, and not before. Products will be produced in the quantity requirements and at the rate required to load them onto a delivery vehicle for a customer. The result is a much simpler manufacturing process, greatly reduced inventory levels, a dramatically lower total manufacturing cost, and a low distribution cost.

The manufacturing system of the present invention is based on delivery system requirements. This anticipates the most effective delivery system and the manufacturing systems to effectively supply it. If the delivery system demands variable rates of loading, variable numbers of vehicles being loaded at a given time, and variable pallet configurations, all are available to maintain the delivery and customer requirements. The system also utilizes the standard bottles that allow for other products to be stacked on top of the product which in turn maximizes the delivery process.

Figure 1:
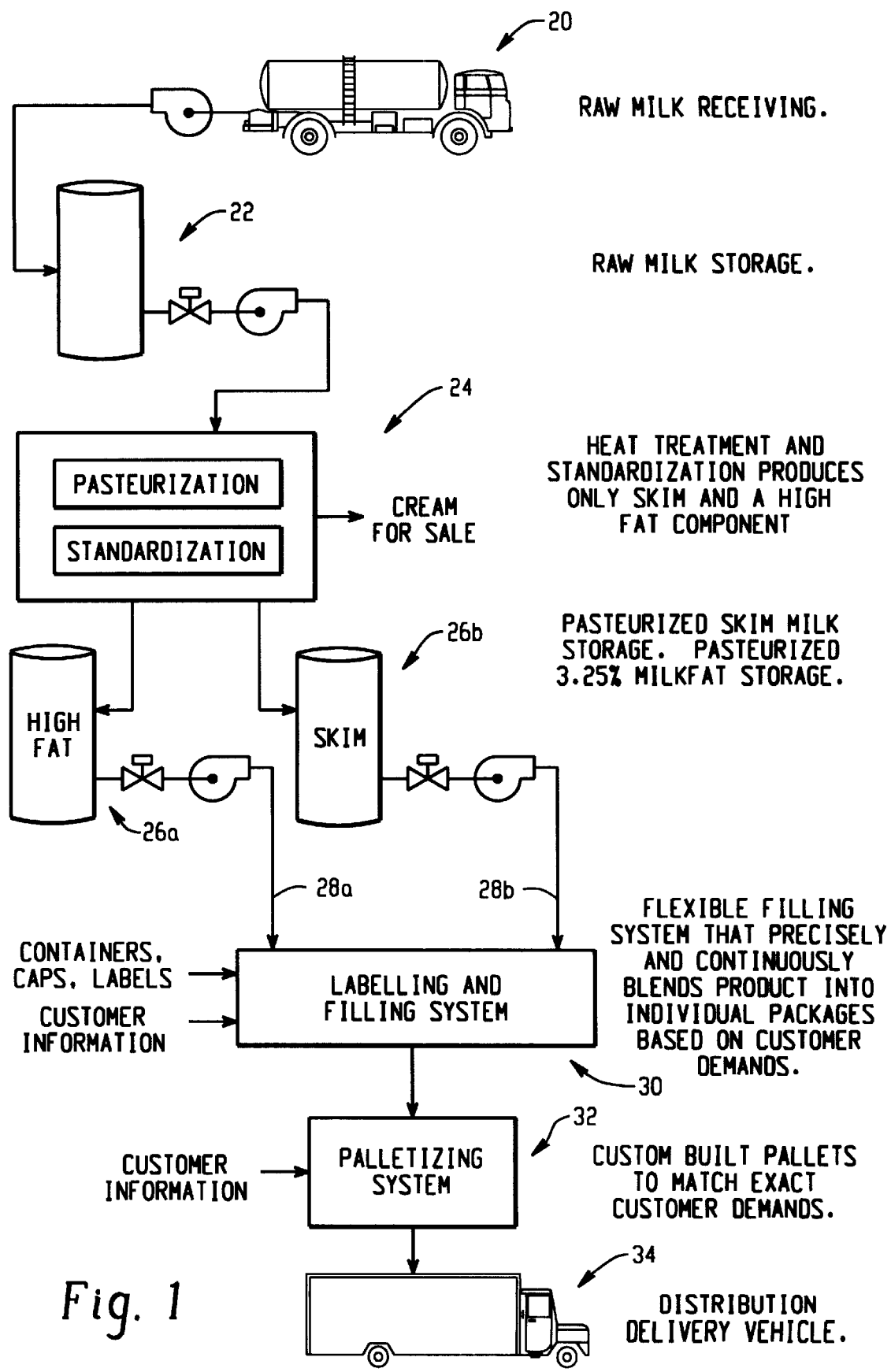
FIG. 1 is a general flow diagram that presents an overview of a flexible filling process in accordance with the present invention.

FIG. 1 is a flow chart that describes the basic process utilizing the current invention. Milk is received, for example, by a truck 20, stored in a raw milk storage silo or tank(s) 22, processed by conventional or new technologies as represented at 24, and is standardized to a non-fat or a skim component and to a high fat (3.25% fat or above) component. These individual products are stored in separate pasteurized storage vessels 26a and 26b. Separate supply lines 28a and 28b extend from each vessel to transfer the product to a filling system 30. The filling system, with information from the customer information system, labels and fills bottles or containers exactly to meet the customer requirements. The products are then palletized as referenced at 32 and loaded at 34 directly onto an available delivery vehicle or truck.

Figure 2:
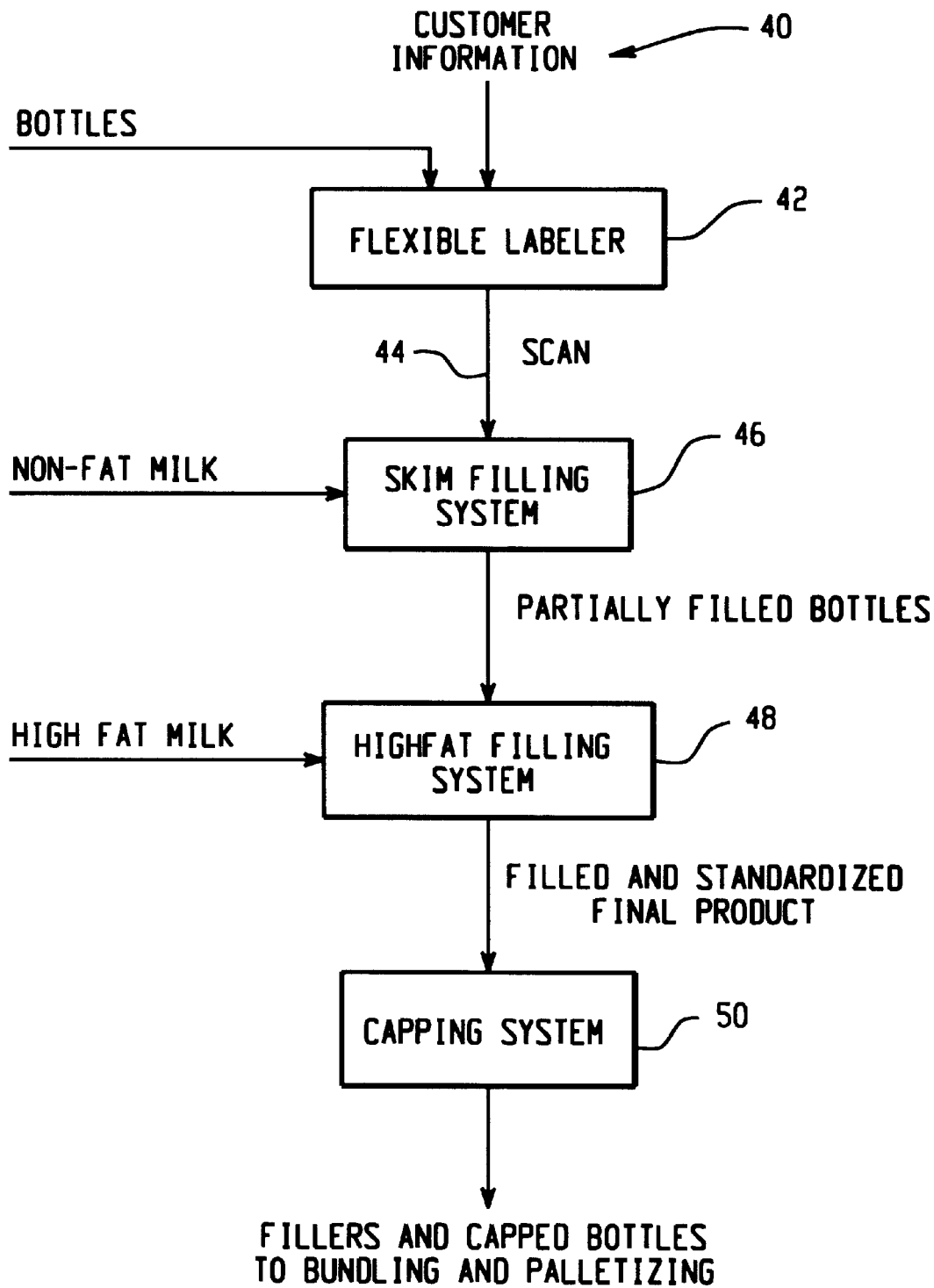
FIG. 2 is a flow diagram representing the flexible filler in accordance with the present invention.

FIG. 2 provides a general flowchart of the filling system of the present invention. This system has customer information or requirements in terms of product type, brand name, ingredient information, nutritional information, color requirements and in many cases specific label requirements that are input at 40. A label is printed in the appropriate sequence at a flexible labeler 42, and is applied to the bottle as it passes through the label application device. The information on the label includes a UPC (Uniform Product Code) barcode which is scanned at 44 and product type is identified. Other means to identify the bottle could also be used, such as optical character recognition and vision systems. A control system 46 for skim filling dispenses the appropriate amount of skim milk into the bottle. The bottle proceeds next to the high fat filling system 48. This system dispenses the appropriate amount of high fat product into the bottle. The bottle moves to a capping station 50 and then to the bundling and palletizing units.

Varying types of milk are mixed directly in containers by filling calculated weights of skim and high fat milk. For example, a 3-liter bottle filled with milk weighs proximately 3,000 grams. With the approximate weight in mind, the appropriate "X" and "Y" values (wherein X is a weight of skim milk and Y is the weight of 3.25% milk) for the various products are as follows:

| Final Product | X grams | Y grams |
| --- | --- | --- |
| Skim | 3000 | 0 |
| 1% | 2110 | 891 |
| 2% | 1172 | 1828 |
| 3.25% | 0 | 3000 |

The filling equipment is programmed with the weights of the various milk grades and volumes. The container moves through the system, and the appropriate weight portion of milk is directed therein.

The containers are filled using a filling valve or orifice. During operation, the container is filled to a predetermined amount. Generally, this amount corresponds to a final desired content based on weight, volume, depth or other measure. A sensor of the desired measure provides feedback to the filling orifice. The feedback signals the orifice to close. This stops the flow into the container. For example, in the case where the fill is based on weight, a scale will send a feedback signal to the filling orifice to close the valve once the desired weight is achieved. Of course other sensors that are based on different measurable parameters can be used without departing from the scope and intent of the present invention.

Figure 3:
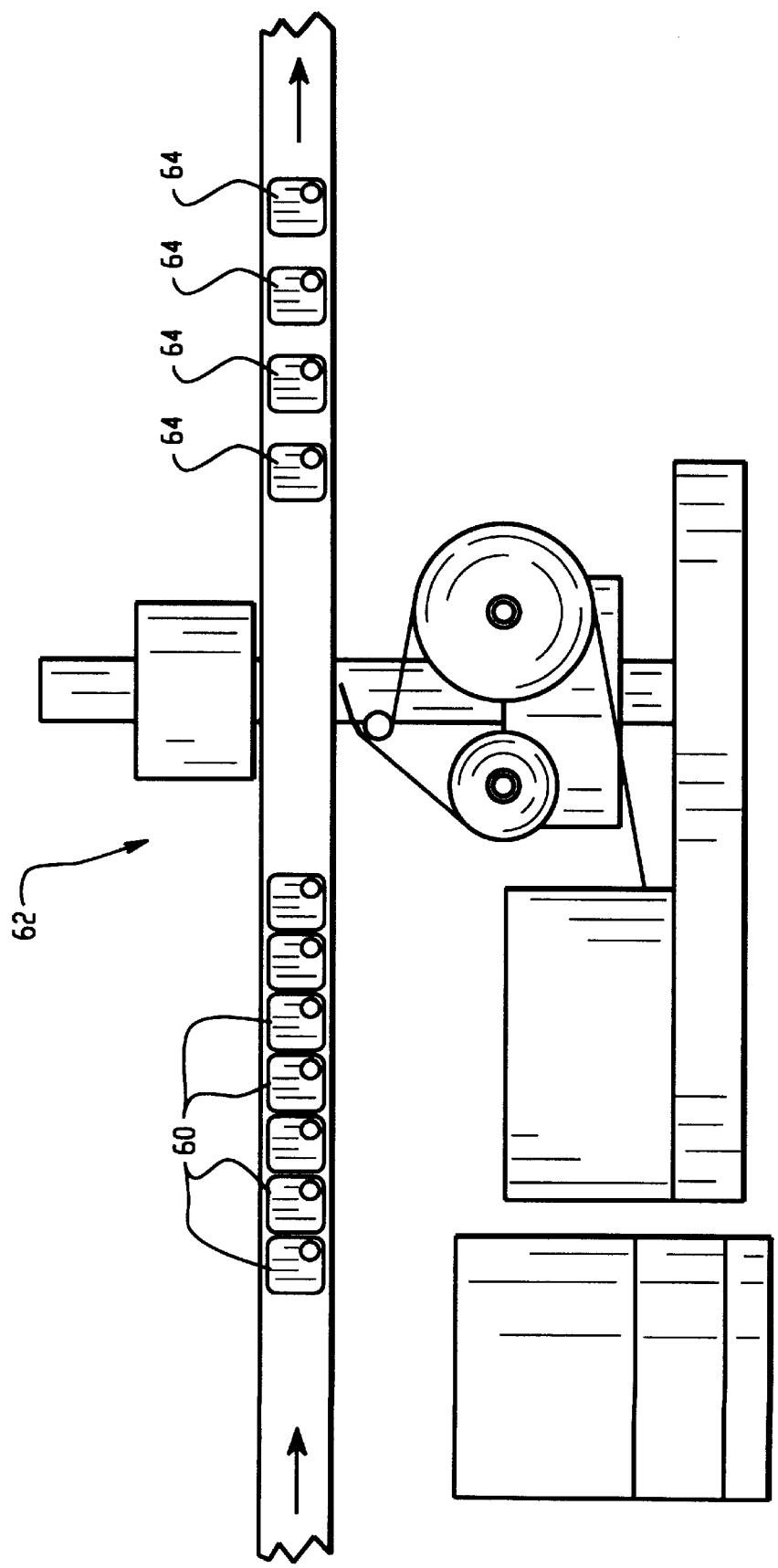
FIG. 3 illustrates the "print and apply" flexible labeling process in accordance with the present invention.

FIG. 3 illustrates the labeling process. This process has unlabeled and appropriately oriented bottles 60 entering a label application device 62. As the unlabeled bottle enters the applicator, customer requirement information directs the label printing unit to print a specific label and a specific sequence of labels, as has been determined by customer and delivery optimization requirements. Unprinted labels are supplied to the printer; the printer discharges a stream of labels, which are conveyed, to the label applicator. Alternatively, rolls of labels in the proper sequence to fulfill a customer's order could be prepared in advance of producing the order. This could be accomplished by preprinting the roll of labels, or splicing together preprinted labels in the proper sequence. The label applicator applies the sequenced labels to the unlabeled bottles. The now labeled bottles 64 are directed to the filling process.

Figure 4:
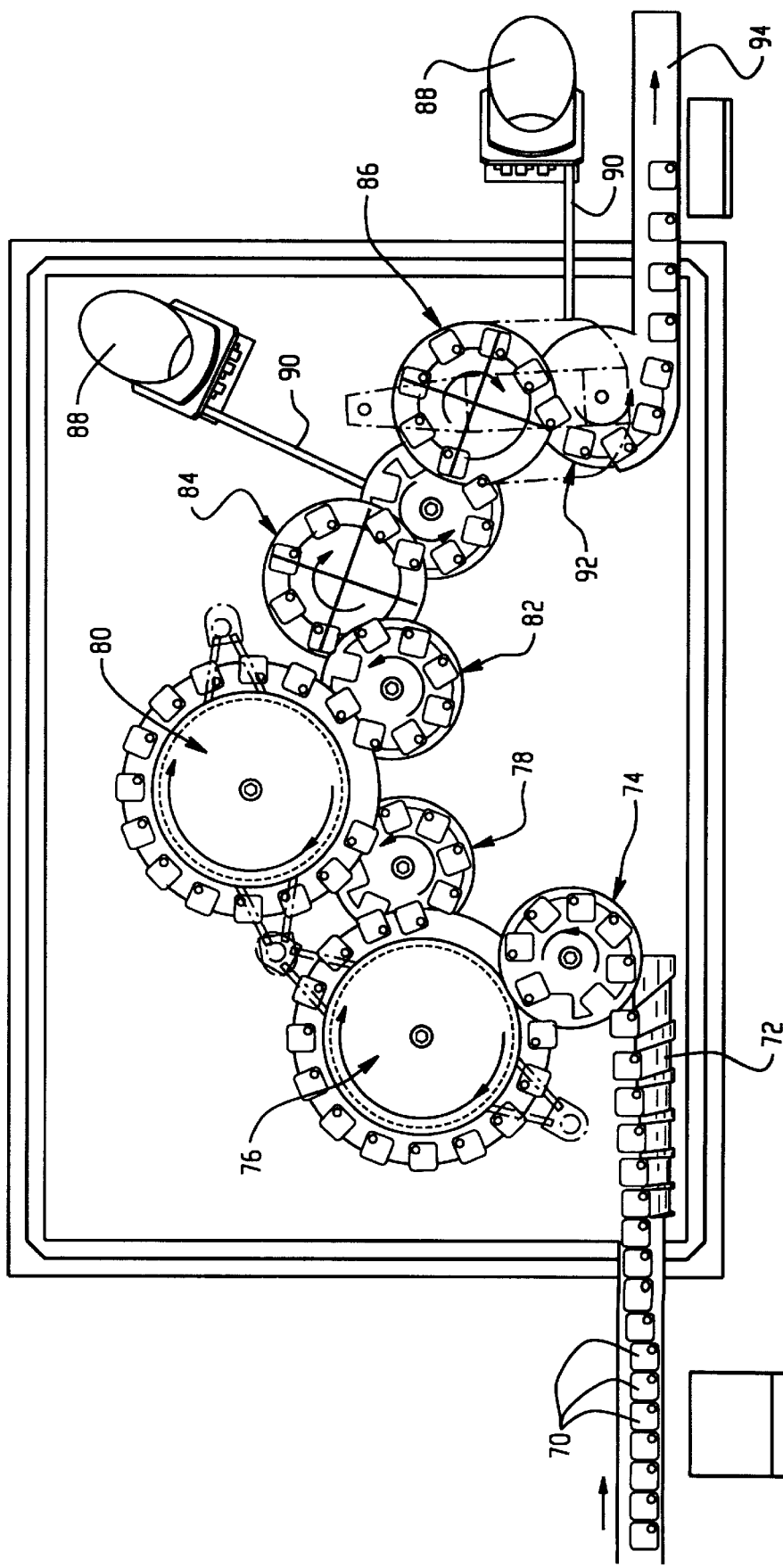
FIG. 4 is a plan view of a flexible filler in accordance with the present invention.

FIG. 4 is a diagram of the actual flexible filling process as it would occur on a Serac filler modified to incorporate two filling bowls in accordance with the present invention. The oriented bottle 70 enters the filler and is metered into the first transfer turret by a metering screw 72. At this point, the label on the bottle is scanned for the information that identifies the product to be filled. The label information allows the filling system to access the exact product information for this particular product from the control system for the filling process. A first transfer turret 74 locates the bottle under the nonfat milk fill system 76 and onto a platform containing a load cell. This load cell and the control system of the filler act to measure a predetermined amount of the nonfat milk into the bottle. When the bottle is secure on the filler turret 76, the control system opens the valve to allow product to flow into the bottle until the exact amount is entered. The control system then shuts the fill valve and the bottle is transferred from the nonfat fill turret via a second transfer turret 78 to a high fat milk fill turret 80. The control system and platform load cell system associated with the high fat fill system adds the final amount of high fat milk to the bottle. The filled bottle containing the standardized product is removed from the high fat fill turret by a third transfer turret 82. This turret transfers the filled and standardized product bottle to preliminary and final capping stations 84, 86, respectively. These stations may use conventional capping techniques or may use additional techniques receiving caps or pour inserts from hoppers 88 through feed lines 90 to provide added features to the package. An additional transfer turret 92 transfers the finished product from the filler to a discharge conveyor 94, which in turn carries the product to the bundling and palletizing areas.

Figure 5:
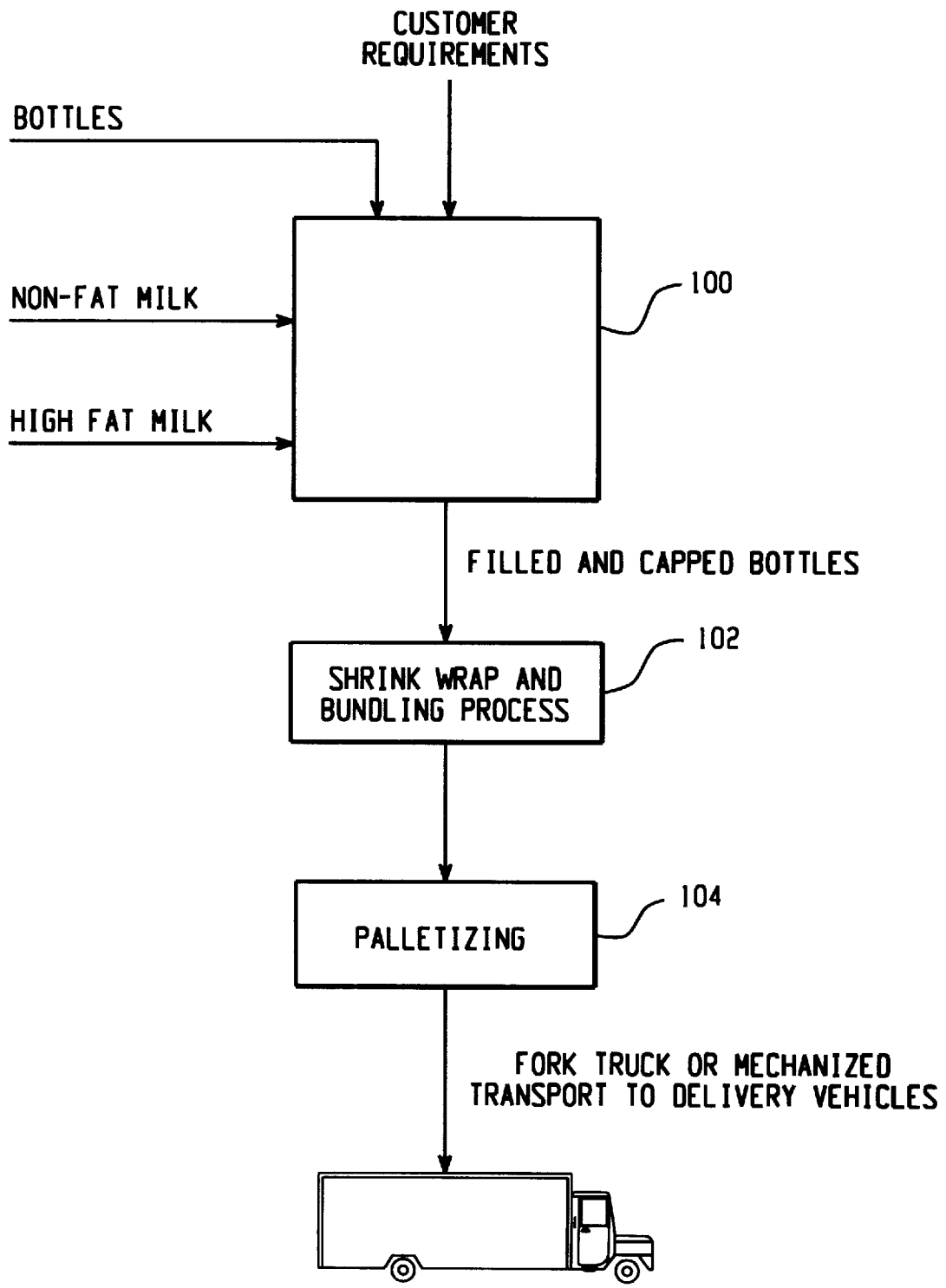
FIG. 5 schematically shows the integration of the flexible manufacturing system into the distribution process in accordance with the present invention.

FIG. 5 conceptually illustrates the integration of this flexible manufacturing system into a distribution process. The manufacturing cell 100 (substantially as described above), operating and responding to the customer requirement information system, discharges filled and closed product (bottles) to a wrapping/bundling system 102 in a sequence that exactly matches the distribution requirements and the customer requirements as needed for consumer satisfaction and optional operational efficiency. Without losing the predetermined sequence, the products are palletized at station 104 to provide a specific pallet with a predetermined mixture of nonfat, ½%, 1%, 2% or 3.25% product on each layer. Each pallet may also have a varying number of layers. For example, one pallet may only have three layers and a third pallet may have four layers. The final determination is based on the optimization of the customer requirements and distribution processes.

The application of the present invention to meet the order fulfillment requirements of the dairy industry's operations has been illustrated in FIG. 6. This illustrates the control and operation of this flexible manufacturing approach in a more fully integrated environment. The customer information, which is part of the business information 110, is supplied to a supervisory control system 112. This control system maintains and directs a bottle making system and process 114, labeling system and process 116, the filling and capping system and process 118, the bundling system and process 120, and the palletizing system and process 122. Additionally, the system monitors the process to ensure proper sequence is maintained and provides a coordinated label printing for the completed pallet prior to the issuance to delivery system 124. The supervisory control system is in constant communication with the business control system. The result is that prioritized information is supplied to the supervisory control enabling the coordination of completed pallets that exactly match the priorities of loading and delivery schedules. This is all achieved with virtually no inventories of empty bottles, of preprinted labels, finished or pre-packaged product inventories, and standard palletizing or product configurations that force unnecessary and undesirable constraints on distribution or customers.

Figure 7A:
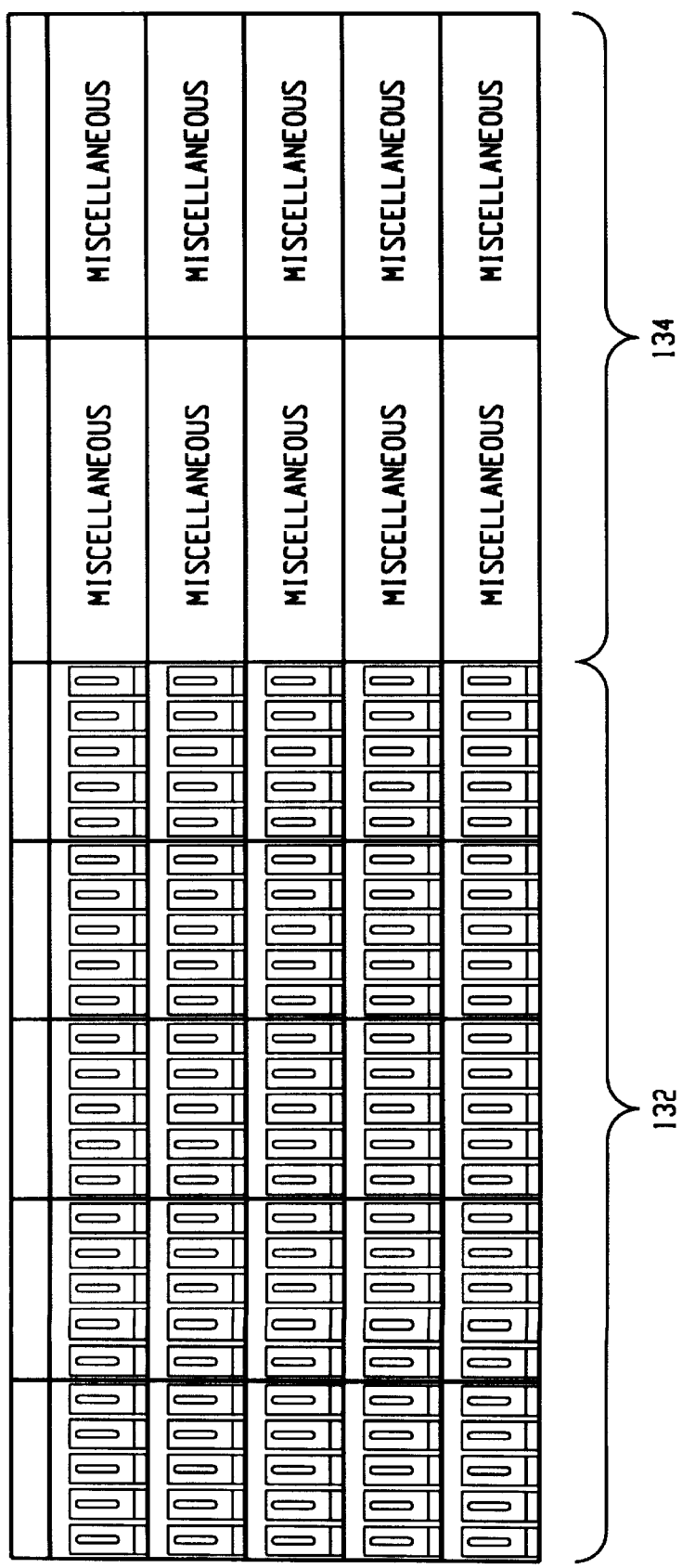
FIG. 7 depicts a typical display in a retail store and the factors affecting replenishment.
Figure 7B:
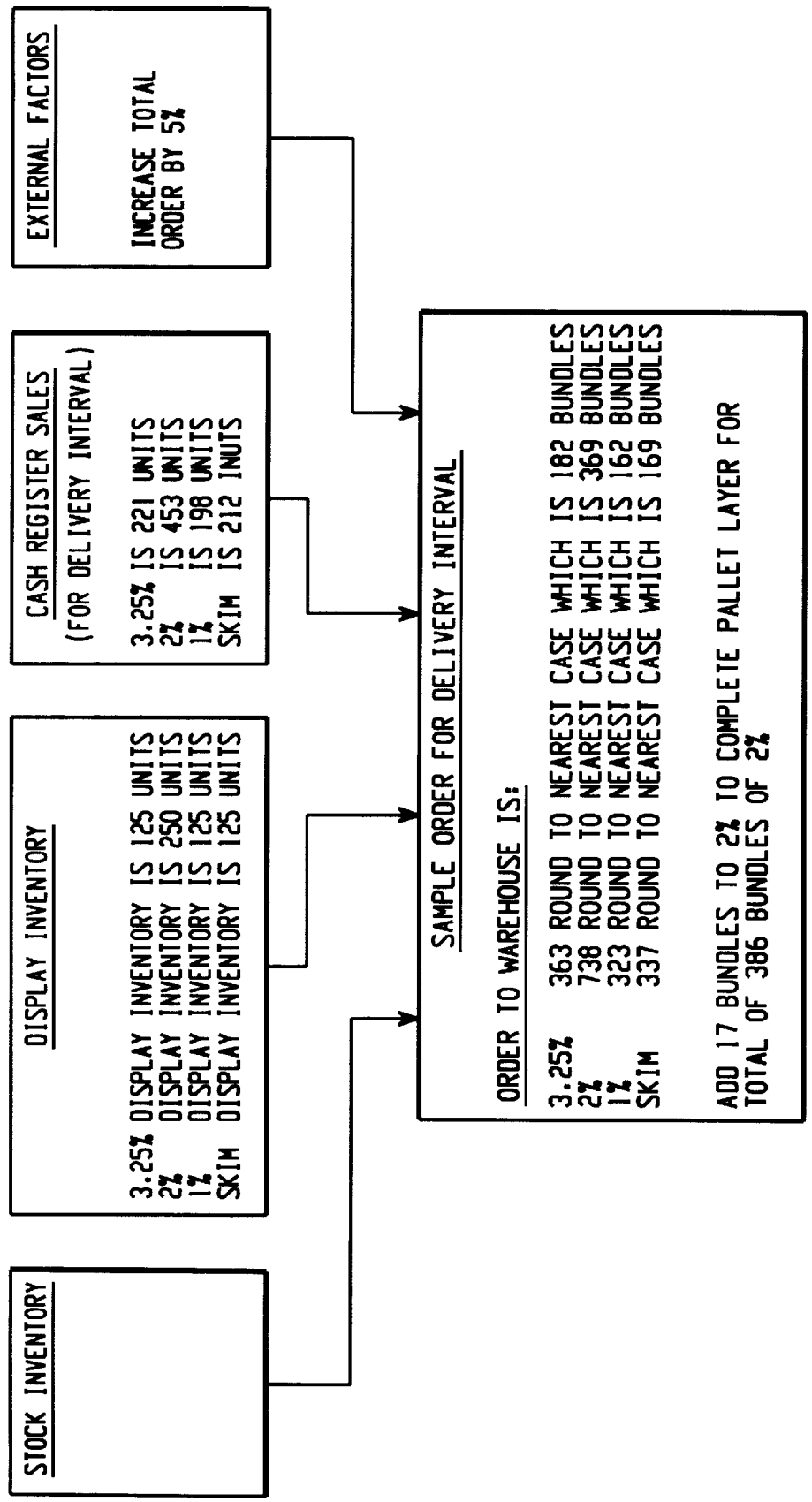

The application of the present invention is further explained by examination of the customer requirements and the information generated at the customer level as exemplified in FIG. 7 (FIGS. 7A and 7B). FIG. 7A illustrates a typical display 130 in a retail store and the factors affecting replenishment. The display consists of 50% to 60% of the available space for the large volume items that constitute approximately 60% to 70% of the dairy product sales. These products typically include the four or five major milk items represented by display portion 132. The remainder 134 of the display is made up of approximately one hundred other items that constitute the remaining 30% or 40% of the sales. The order fulfillment criteria are the available display space, the delivery frequency, the level of cash register sales, and non-display inventory and certain external factors such as weather, time of month, etc. These factors may translate into an order to the supplier, manufacturer or warehouse as indicated. This example states that the order fulfillment process at store level requires three hundred sixty three units of 3.25% product. Because there are two units in a bundle, the order is rounded up to three hundred sixty four units or one hundred eighty two bundles. Similarly, the 2% order became three hundred sixty nine bundles, the 1% order is one hundred sixty two bundles and the skim or nonfat milk order is one hundred sixty nine bundles.

FIG. 8 illustrates the transformation that would take place as a result of the customer requirements. In this case, the palletizing requirement is only that full layers be made on a pallet. As a consequence and since a standard 40×48 grocery pallet will allow for sixty two units or thirty one bundles on a layer, the total number of layers is calculated as follows:

3.25%—one hundred eighty two (182) bundles
2%—three hundred sixty nine (369) bundles
1%—one hundred sixty two (162) bundles
Skim—one hundred sixty nine (+b 169) bundles
Total—eight hundred eighty two (882) bundles This equates to 882/31=28.45 layers. This further suggests that the total layers sent will be 29, as we would choose to round up. For this example, we will add the 2% only. Therefore, the dairy may ship seventeen (17) additional bundles of 2% milk.

The twenty nine (29) layer example could be shipped in seven (7)-four (4) layer pallets and one (1) layer pallet. It could also be shipped as five (5)-five (5) layer pallets and a four (4) layer pallet, or as five (5)-four (4) layer pallets and three (3)-three (3) layer pallets.

FIG. 8A shows the five individual layers for a pallet. With thirty one (31) bundles per layer, there are one hundred fifty five (155) individual bundle locations on the pallet. Each can be filled with an individual product based on the customer requirements.

Figure 8B:
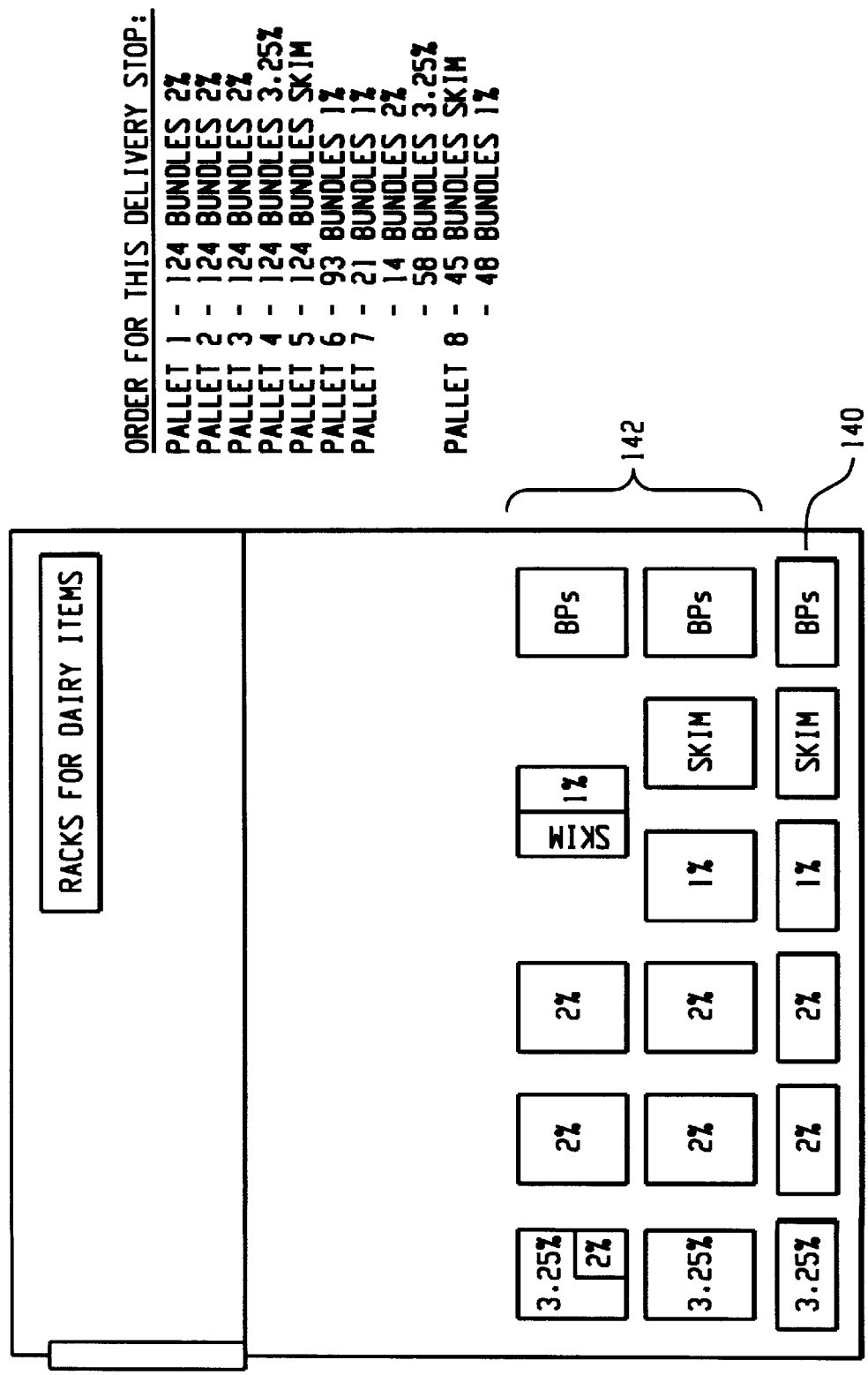
FIG. 8 illustrates how a customer order is translated to the configuration requirements for pallets of finished product.

FIG. 8B also shows a plan view of the retail stores display 140 and the reserve storage 142 behind the display. Based on this layout the product should be palletized so proper product can be located directly behind the product being displayed to assure maximum efficiency at the store level. The fact that the product is shipped in a "caseless" manner means that no space has to be reserved to maneuver empty cases and that no lost motion is required on the part of the store's employee during the re-stocking process. With this consideration, the pallets could be loaded as indicated in the table shown in FIG. 9.

This configuration could also be changed to accommodate other distribution constraints. An example would be to ship other products on top of the pallets of milk. This is practical due to the caseless nature and strength of the caseless bottle as shown and described in commonly owned, co-pending application Ser. No. 09/114,244, filed Jun. 29, 1998, the details of which are incorporated herein by reference. Based on this, the twenty nine (29) layers may become nine (9)-three (3) layer pallets and one (1)-two (2) layer pallet. The distribution of products per pallet would obviously change to accommodate the total needs.

Figure 10:
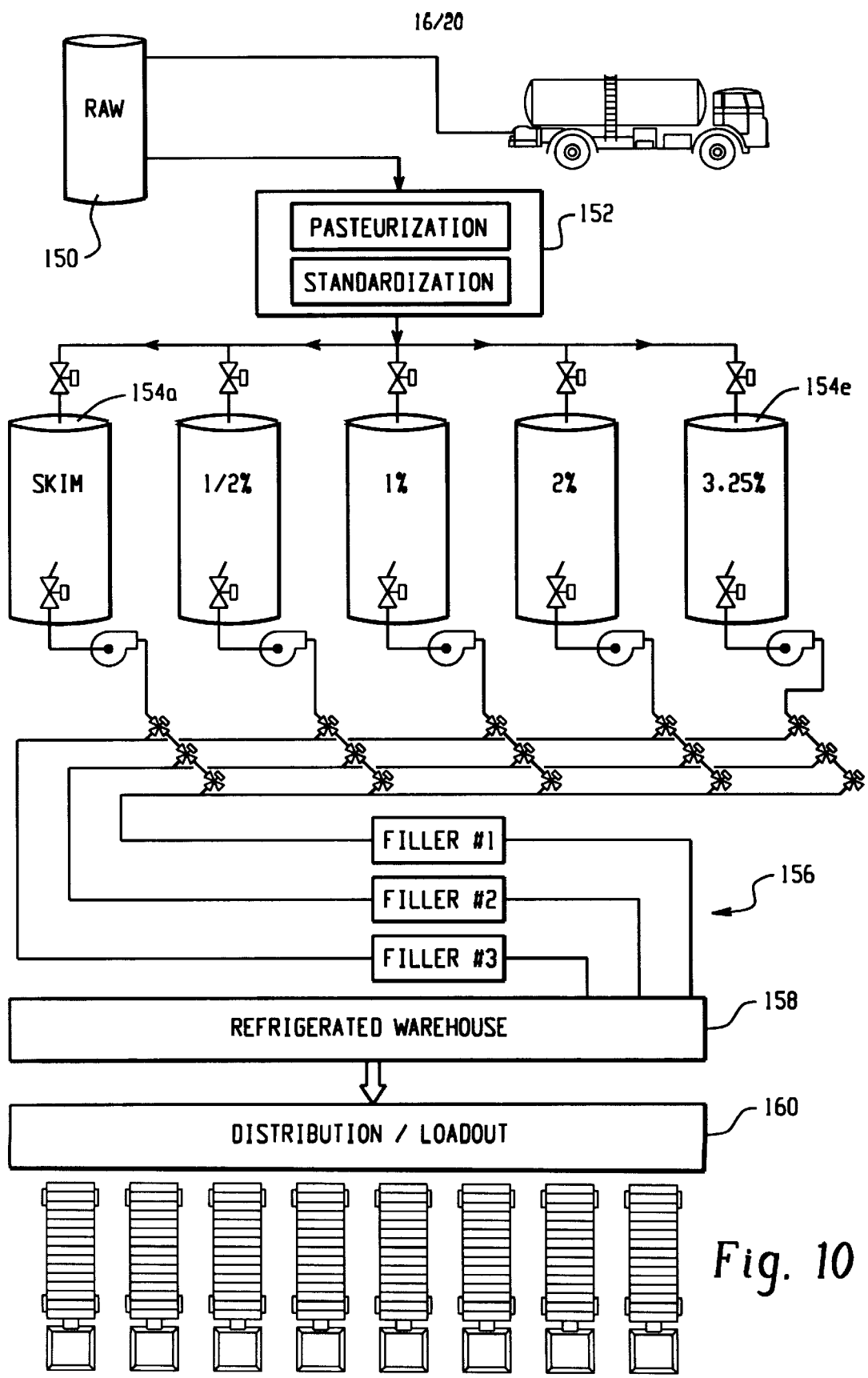
FIG. 10 is a flow diagram representing a conventional milk process.

As is indicated by the previous example, the present invention has the ability to flexibly fulfill customer requirements based on optimal scenarios. A common feature among the full service dairy manufacturers and distributors is that approximately 60% of their daily throughput is the white milk described as 3.25%, 2%, 1%, ½% and skim milk. It is also true that these manufacturers create large batches of these white milk products. They currently fulfill customer requirements through processes similar to, if not exactly as shown schematically in FIG. 10. This process begins with raw milk being received and temporarily stored in silo tanks 150. Raw milk will be withdrawn through the raw silo tanks 150, pasteurized and standardized at 152 into large vessels 154a–e to hold each type of pasteurized and standardized product (3.25%, 2%, 1%, etc.). Filling machines 156 will then draw from the various pasteurized product tanks, one product at a time, and put a specific type of milk into a specific pre-labeled bottle (i.e., 2% milk into brand X package). These containers are then put into returnable cases (or transport devices) or corrugated one way shippers. The product is then sent to a storage or distribution center type of system 158. The product is collected from storage 158 based on orders from customers. It is picked, selected, accumulated or somehow assembled into a load that will be put onto a delivery vehicle with a usual mission of only delivering the dairy products from that particular dairy warehouse or distributor as represented at 160.

Figure 11:
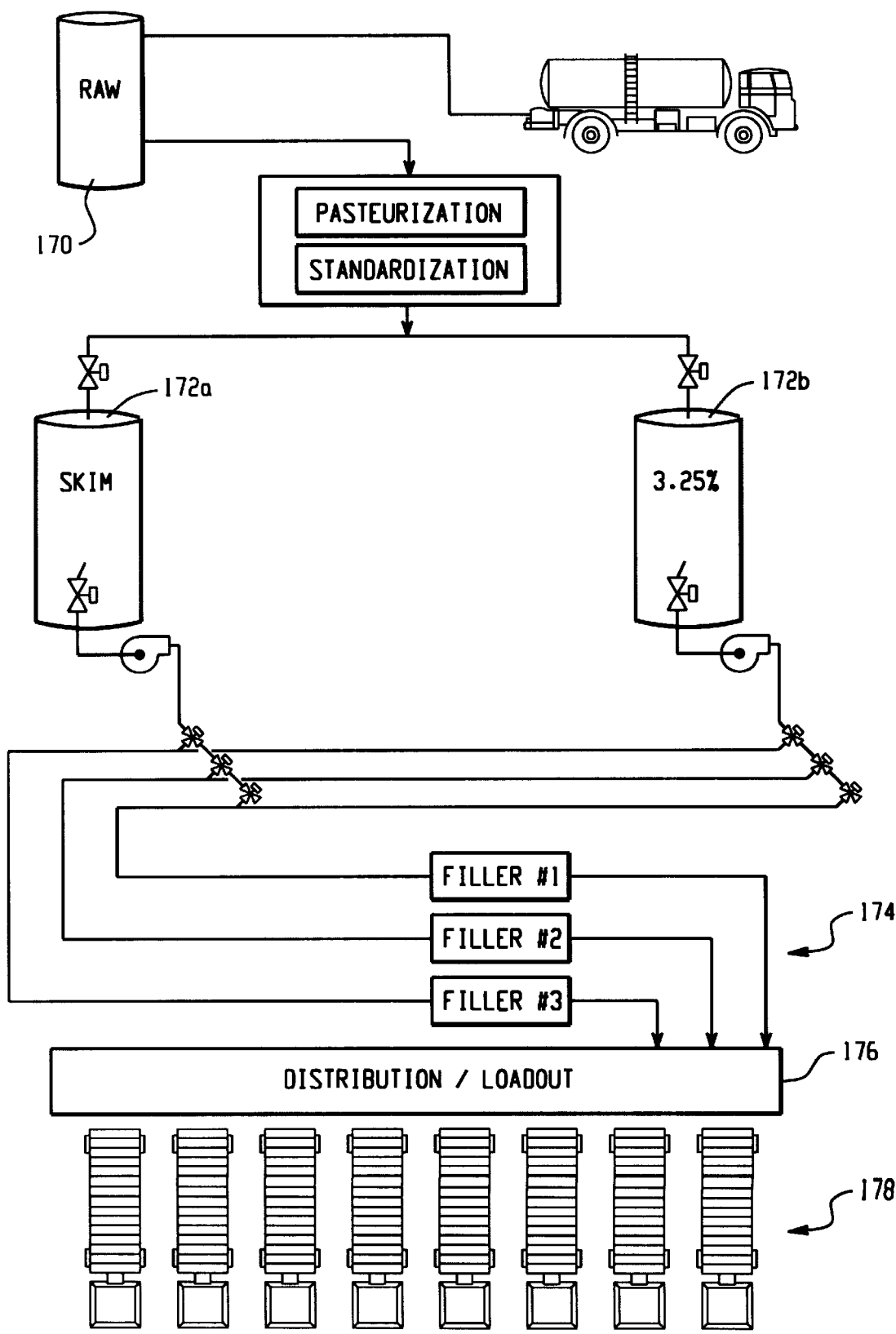
FIG. 11 is a flow diagram representing the simplification achieved by the flexible manufacturing process in accordance with the present invention.

The present invention provides a revised approach for the 60% to 70% of the volume of products typically handled by the full service manufacturers and provides an improved approach to the manufacturers who are virtually only white milk manufacturers today. FIG. 11 shows the schematic of the revised manufacturing process. Raw milk is received and temporarily stored in raw storage vessels 170. Raw milk is drawn from the vessels and is processed into a nonfat and a high fat components 172a and 172b only. These two components are blended together at 174 based on customer and delivery needs, palletized and directed to the load out facility 176 in a manner synchronized with the proper loading time of the vehicle(s) 178.

The present invention, as applied and described above, provides an improved approach to the delivery of milk and other refrigerated products associated with the grocery store business.

Figure 12:
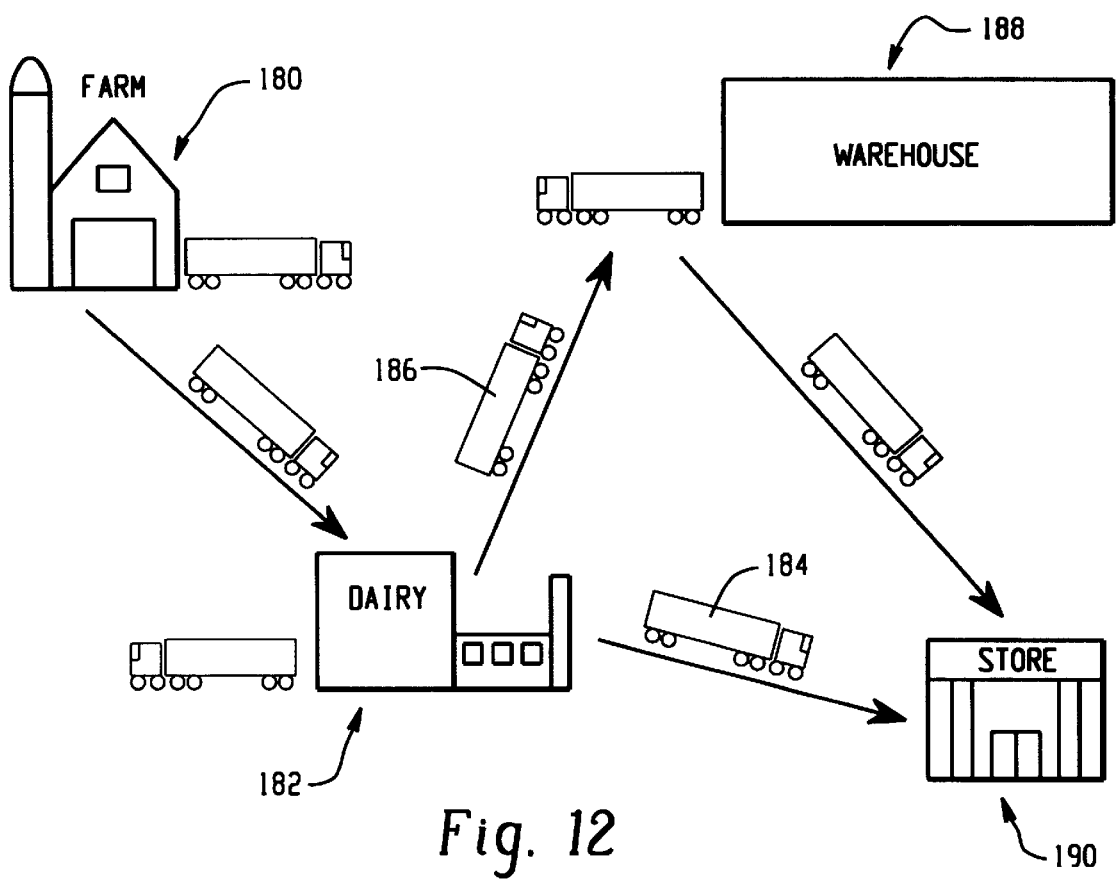
FIG. 12 illustrates the conventional method for the milk supply chain from the farm to the store.

FIG. 12 illustrates the current method of bringing milk in its raw state from the original source (the farm), to the grocery store or the final retail businesses that makes the product available to the consumer. The milk is produced on a farm 180 and shipped via insulated tank truck to the dairy 182, where it is processed in the conventional manner as shown and described above. The product is then shipped directly to the store in certain instances as represented by numeral 184. It is also shipped as represented by numeral 186 to various distributors or warehouses 188, where it is re-loaded and re-shipped, to the final retailer 190.

Figure 13:
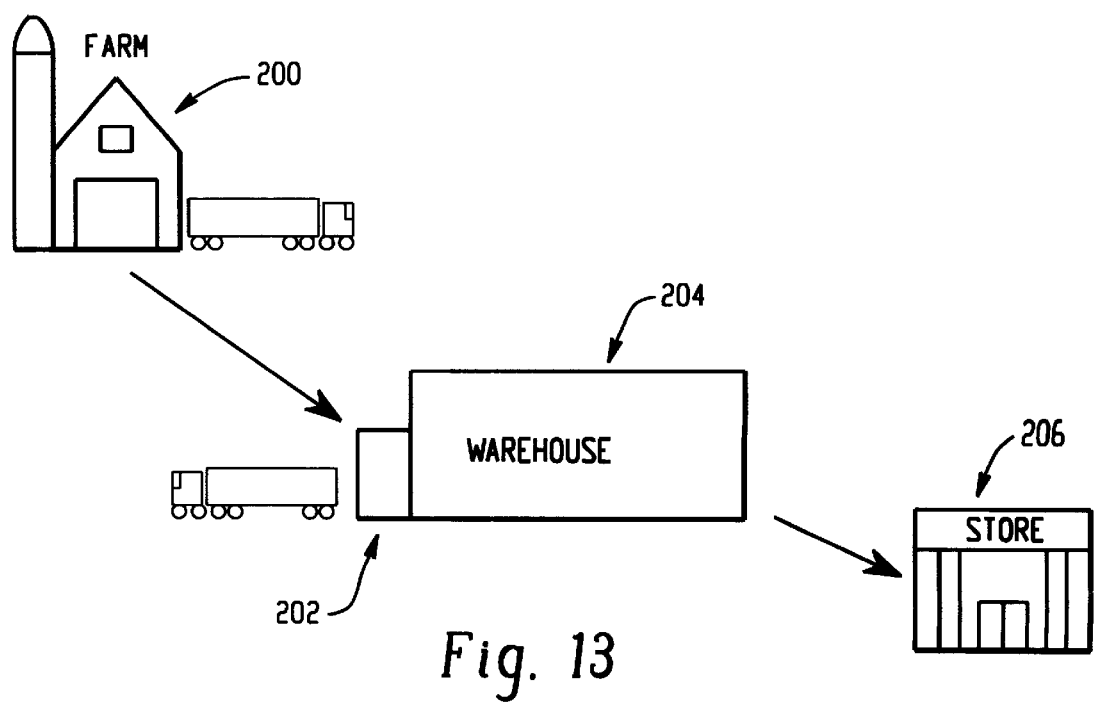
FIG. 13 shows the simplified milk supply chain from the farm to the store in accordance with the present invention.

The present invention allows and promotes the use of an improved approach as illustrated in FIG. 13. This approach provides for the direct transfer of the raw product from a source 200, or farm, to a micro dairy 202 associated with a warehouse or primary distribution supply 204 to the store or food retailers 206. This allows the advantages of the flexible filling invention to be applied to the warehouse distribution network. The use of the structural caseless package as described in the commonly owned, co-pending application identified above and the flexible filling system shown and described herein permits the integration of traditional warehouse products with the white milk products constituting maximized delivery efficiency. This is realized based upon the low maximum weight and cube in a warehouse delivery vehicle and on the improved frequency of delivery for the retailer.

Figure 14:
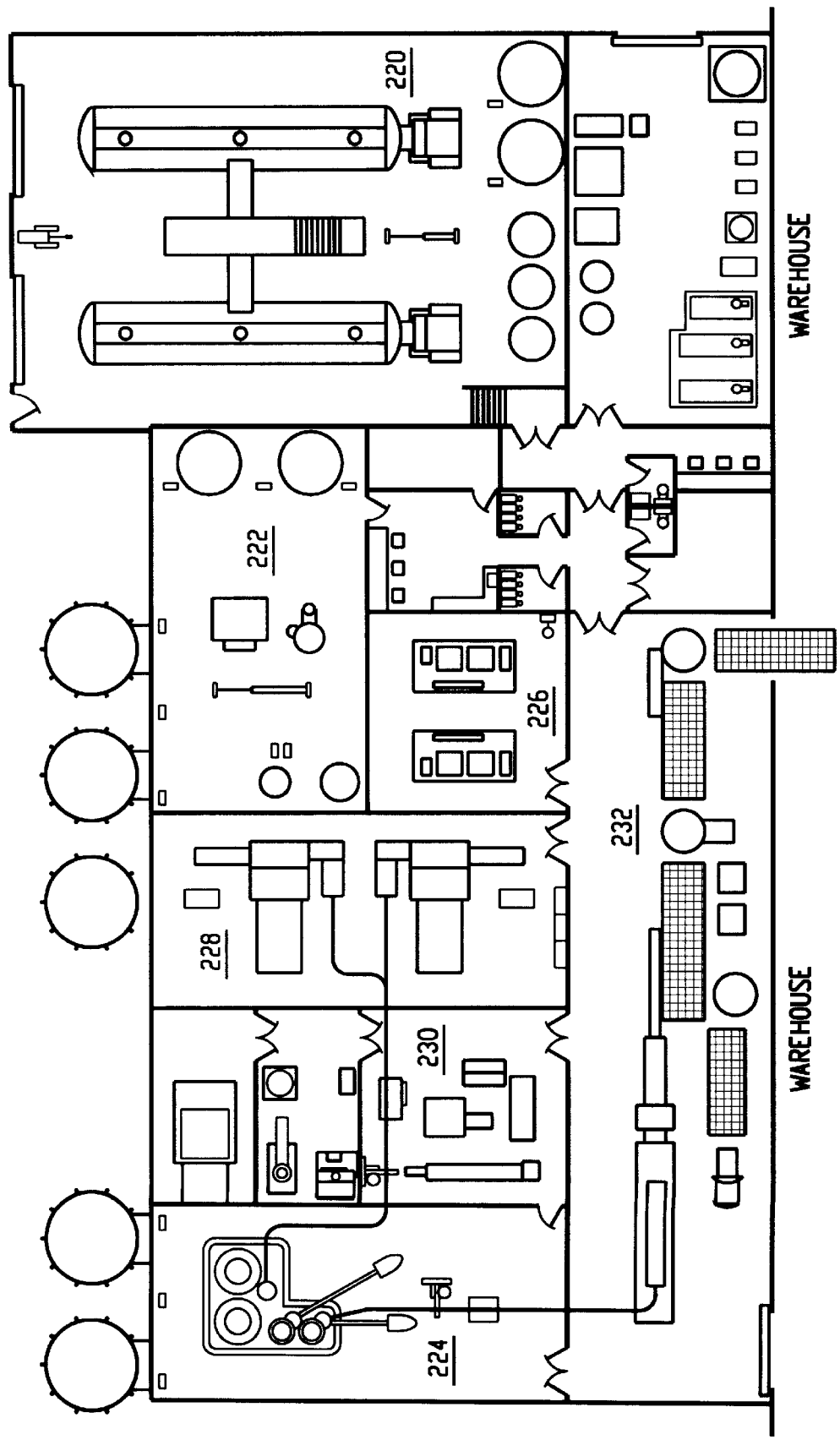
FIG. 14 is a plan view of a micro dairy facility in accordance with the present invention.

This current invention further allows for the development of an integrated micro dairy facility to be operated in conjunction with a warehouse or distributor of even smaller proportions as compared to current industry standards. FIG. 14 illustrates such a facility capable of successfully completing all functions as needed for the warehouse or distribution facility. For example, a receiving bay 220 receives the raw milk into the micro dairy facility. The raw milk is processed at a raw milk treatment station 222. This provides the two grades of milk which in the preferred embodiment are 3.25% and skim. The processed milk is stored and subsequently forwarded to filling station 224 where it is easily conveyed to the filler as described above. Control room 226 handles or coordinates the actions of the micro dairy including receiving data regarding raw milk input, processing control, production of various sized containers or bottles at a blow molding station 228, labeling at station module 230, filling at 224, and palletizing and shipping at 232.

Figure 15:
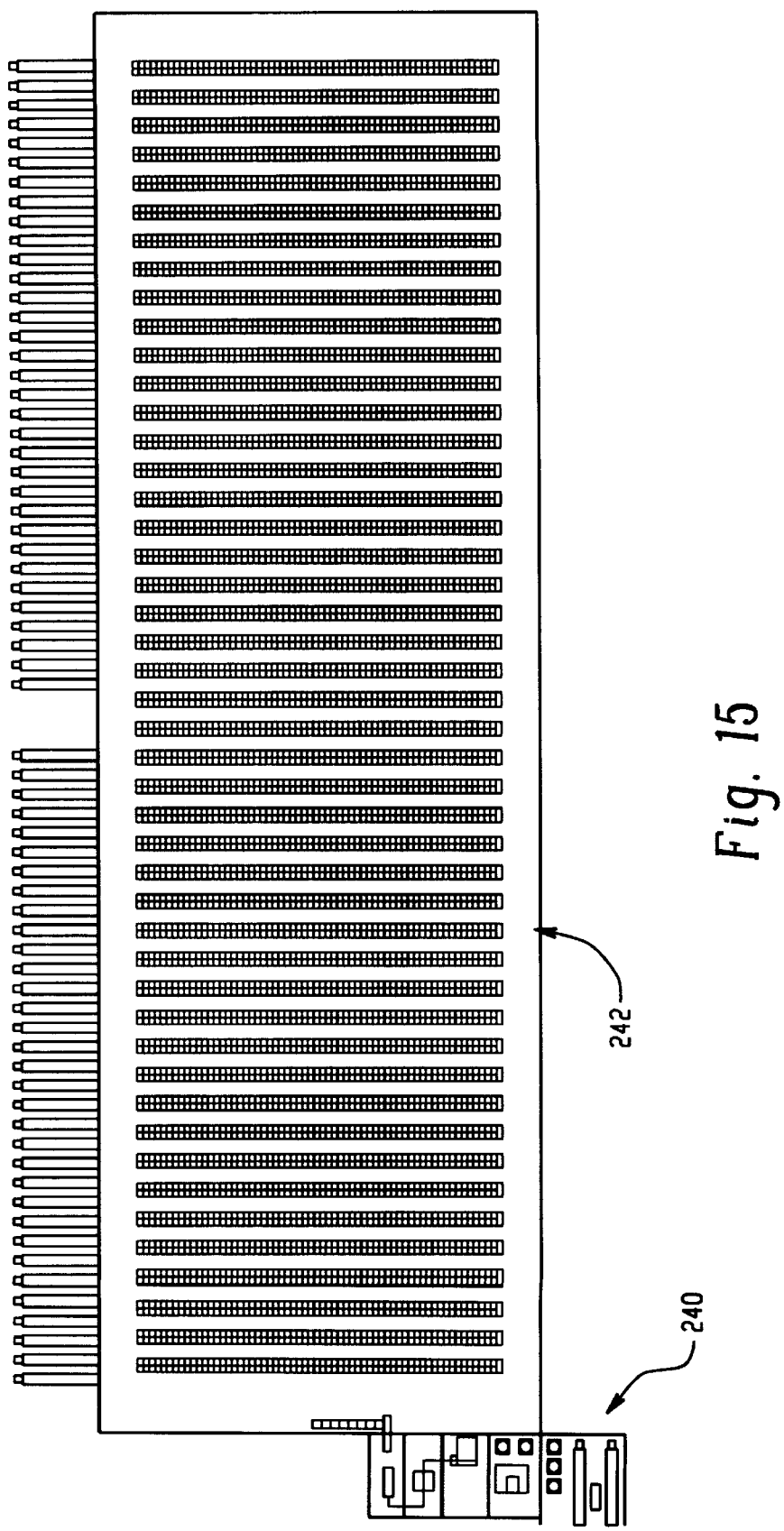
FIG. 15 illustrates how a micro dairy might be integrated with an existing distribution facility in accordance with the present invention.

FIG. 15 further shows a typical application of this micro dairy facility 240 as a small addition to a typical warehouse 242 that would be distributing product to a retail grocery outlet. As noted, this concept applies to both small and large distribution applications.

It can be seen that there are many advantages for manufacturers in this approach. Processing of different milk grades is reduced down to two types: skim and 3.25%. The need for large storage tanks for the different milk grades is likewise reduced. Since the filler bowls will each have only one product in them for the entire production day, changeovers are eliminated, thereby reducing labor and waste. Finally, since the filler is completely responsive to the needs of the distribution department, load out is simplified, and the required warehouse space is vastly reduced. Overall, the entire manufacturing plant process is greatly simplified, is reduced in size, and reduced in complexity.

Accompanying this concept, a high hygiene and highly reliable filler is anticipated. A filling system includes the filler and the high-speed label printing process described. This system has the following attributes:

Accurate filling of two or more components into the same container to get variable attributes from the flexible process.

The ability to change product without loss of efficiency. In other words, a system able to change without interrupting or halting production.

The ability to produce product accurately and exactly as customer requires.

The ability to integrate and interpret commands from the control system based on customer requirements into labeling and filling commands to exactly meet the customer expectations.

The ability to match the variable demands of loadout processes without depending on excessive inventories. This surplus drastically reduces storage space compared to conventional manufacturing techniques.

The invention has been described with respect to the preferred embodiments. Modifications and alterations will occur to others upon a reading and understanding of this specification. It is intended to include all such modifications and alterations in so far as they come within the scope of the appended claims or the equivalents thereof.

Having thus described the invention, it is now claimed:

1. A process for producing milk comprising the steps of:
   delivering raw milk to a raw milk storage station;
   processing the raw milk into first and second milk varieties; and
   filling a container from at least one of the first and second milk varieties, the filling step introducing a predetermined weight of the first milk variety into the container and introducing a predetermined weight of the second milk variety into the container whereby the first and second milk varieties are mixed in the container.

2. The process of claim 1 wherein the filling step includes the step of providing four or more different types of milk from the first and second processed milk varieties.

3. The process of claim 2 wherein the providing step includes using only the first processed milk variety to form the first type of milk.

4. The process of claim 3 wherein the providing step includes using only the second process milk variety to form the second type of milk.

5. The process of claim 4 wherein the providing step includes using selected amounts of the first and second processed milk varieties to form the third and fourth types of milk.

6. The process of claim 5 wherein the providing step includes using a greater proportion of the first processed milk variety to form the third type of milk.

7. The process of claim 5 wherein the providing step includes using a greater proportion of the second processed milk variety to form the fourth type of milk.

8. The process of claim 1 including the step of supplying first and second containers of different capacity.

9. The process of claim 1 including the step of stacking the filled containers on a pallet and wrapping the containers together on a pallet for shipment to the customer.

10. The process of claim 1 further comprising the step of labeling the individual containers in response to a command from a control member detailing information regarding the container size, customer, and type of milk.

11. The process of claim 1 wherein the first milk variety introducing step is a separate station from the second milk variety introducing step.

12. The process of claim 1 wherein the filling step includes the further step of measuring the weight of the container and the respective milk varieties.

13. The process of claim 1 including the further step of providing feedback to control filling of the containers.

14. The process of claim 1 including the further step of scanning the container for information relating to the product to be filled.

15. The process of claim 14 including the further step of locating the container on a load cell.

16. The process of claim 15 including the further step of transferring the container to a second load cell.

17. The process of claim 16 including the further step of terminating filling of the second milk variety in response to a predetermined weight sensed by the second load cell.

18. The process of claim 1 including the further step of locating the container on a load cell.

19. The process of claim 18 including the further step of transferring the container to a second load cell.

20. The process of claim 19 including the further step of terminating filling of the second milk variety in response to a predetermined weight sensed by the second load cell.

21. A process for producing milk for sale and consumption, comprising the steps of:

receiving raw milk into a raw milk storage station;

pasteurizing the raw milk and then separating the pasteurized milk into first and second milk varieties of different milk fat content; and filling by weight individual consumer-sized containers a) from the first and second milk varieties and b) from varied proportions of the first and second milk varieties where a predetermined amount of the first and second milk varieties in the milk containers is mixed.

* * * * *